United States Patent [19]

Ejiri

[11] 4,071,858
[45] Jan. 31, 1978

[54] CARTRIDGE EJECTION PREVENTING DEVICE

[75] Inventor: Kazushige Ejiri, Iwaki, Japan

[73] Assignee: Alps Motorola, Inc., Tokyo, Japan

[21] Appl. No.: 777,737

[22] Filed: Mar. 15, 1977

[30] Foreign Application Priority Data

Apr. 6, 1976  Japan .............................. 51-42338[U]

[51] Int. Cl.² ............................................. G11B 15/00
[52] U.S. Cl. ....................................................... 360/93
[58] Field of Search ............................ 360/93, 71, 96; 242/199

[56] References Cited
U.S. PATENT DOCUMENTS

| 3,817,539 | 6/1974 | Kawada et al. .......................... 360/93 |
| 3,955,216 | 5/1976 | Fujita ....................................... 360/93 |

Primary Examiner—Robert S. Tupper
Attorney, Agent, or Firm—James W. Gillman; Donald J. Lisa; Phillip H. Melamed

[57] ABSTRACT

A device for preventing a tape cartridge from springing out from the cartridge entryway of a tape player upon cartridge ejection operation. This device includes a sliding member having one end provided with a roller projection into the cartridge entryway. The sliding member is adapted to slide on an inclined face so that the amount of the roller projecting into the cartridge entryway will increase as the roller and sliding member moves toward the insertion opening of the cartridge entryway, whereby the roller exerts a retaining pressure on the cartridge which increases as the cartridge moves toward the insertion opening of the entryway during cartridge ejection.

10 Claims, 4 Drawing Figures

CARTRIDGE EJECTION PREVENTING DEVICE

BACKGROUND OF THE INVENTION

This invention relates to a cartridge spring-out action (ejection) preventing device for use in a magnetic tape recording and reproducing apparatus. This device is effective to prevent the cartridge from springing totally out of the cartridge entryway during ejection of the cartridge from a tape player or the like.

Conventially, a solenoid plunger or the like has been used to exert an instantaneous impulse force on the cartridge in order to eject the cartridge from a tape player. However, this can cause the cartridge to fall completely out of the cartridge entryway of the tape player resulting in damage to the cartridge and danger to the tape player operator. In order to eliminate such problems, attempts have been made to provide a restraining force by attaching additional structures to the cover plate covering the cartridge entryway so as to stop the cartridge thereat. However, these prior solutions do not provide sufficient performance for various types of cartridges due to their differences in size and weight. Also, these differences in the sizes of cartridges may result in requiring extra force to load cartridges into the tape player to overcome the force exerted by these prior ejection restraining devices.

SUMMARY OF THE INVENTION

Therefore, it is an object of the present invention to provide a cartridge ejection preventing device for use in a magnetically recording and reproducing apparatus which will be free from the above mentioned disadvantages of the conventional devices and which will be effective to prevent the cartridge from springing completely out of the tape player during ejection of the tape player.

In accordance with the present invention, there is provided a cartridge ejection preventing device for use in a magnetic tape recording and reproducing apparatus having a cartridge entryway and a retaining plate covering the cartridge entryway. The cartridge ejection preventing device comprises an attachment attached to the retaining plate and having an upper surface inclined in the forward (insertion end) direction, a sliding member having one of its ends provided with a roller, the sliding member slideable mounted on the inclined upper surface of the attachment so that the roller projects into the cartridge entryway and the amount of the roller projecting into the entryway decreases with the sliding member sliding in the rearward direction, and a spring member for urging the roller downward, whereby the roller can exert a larger pressure on the cartridge as the cartridge is ejected from the entryway.

BRIEF DESCRIPTION OF THE DRAWINGS

The invention will be more fully understood and its objects and advantages further appreciated by referring to the following detailed description of the preferred embodiment considered in conjunction with the accompanying drawings, in which.

DESCRIPTION OF THE PREFERRED EMBODIMENT

Figure 1:
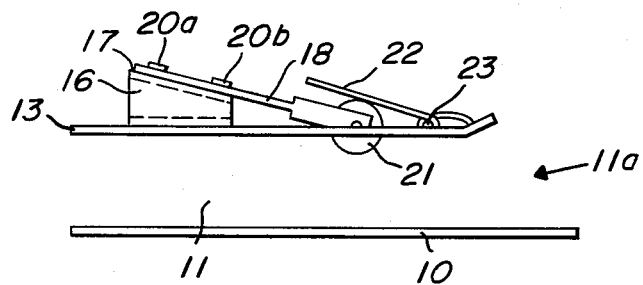
FIG. 1 is a side plane view of a cartridge ejection (spring-out action) preventing device for a tape player constructed in accordance with the present invention.
Figure 2:
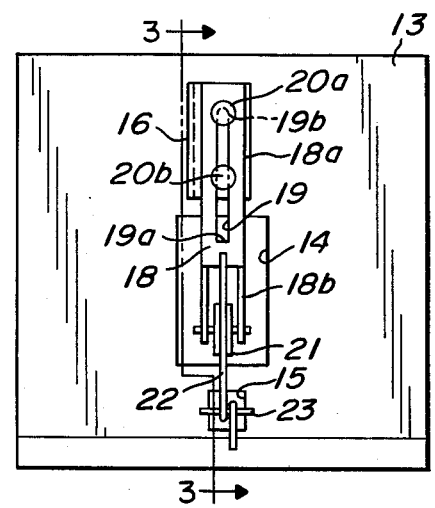
FIG. 2 is a top plane view of the device of FIG. 1.

Referring now to FIGS. 1 to 4, a frame 10 of a tape player or the like is formed having a cartridge entryway 11 with an insertion (forward) end 11a into which a tape cartridge 12 containing a magnetic tape therein is to be inserted. Provided above the cartridge entryway 11 is a retaining plate 13, which can be part of the frame 10, and which prevents up and down movement of a cartridge 12. The retaining plate 13 is formed with holes 14 and 15.

Secured to the retaining plate 13 is an attachment 16 having an upper surface 17 inclined in a downward direction toward the forward (insertion) end 11a of the cartridge entryway 11. The attachment 16 is fixed in its position with respect to said entryway 11. A sliding member 18 has a rear portion 18a formed with a guide groove slot 19 and is slideably mounted on the inclined upper surface 17 of the attachment 16 by means of stopper pins 20a and 20b which are mounted to attachment 16 and are located in the guide slot 19 and determine the maximum possible sliding movement of the member 18. The sliding member 18 is generally slideable towards and away from the insertions end 11a along the upper surface 17.

The sliding member 18 has a front end 18b provided with a roller shaped resilient member 21 which may be formed of rubber or any other material having frictional properties. The roller 21 forms a contact means which engages cartridges inserted in the entryway 11. The resilient roller member 21 projects through the hole 14 of the retaining plate 13 into the cartridge entryway 11. The resilient roller 21 will move toward the cartridge entryway 11 when the cartridge is ejected and move away from the cartridge entryway when the cartridge is loaded. The movement of the roller 21 is caused by the sliding member 18 sliding on the inclined surface 17 of the attachment 16. The stopper pins 20a and 20b control the movement of the resilient roller 21 such that it cannot move out of the cartridge entryway 11.

A spring member 22 is mounted slightly rotatably on a shaft 23 extending across the hole 15 of the retaining plate 13 for urging the resilient roller 21 into the cartridge entryway 11. The spring member 22 has one end abutting on the resilient roller 21 and another end thereof abutting on the retaining plate 13.

Figure 3:
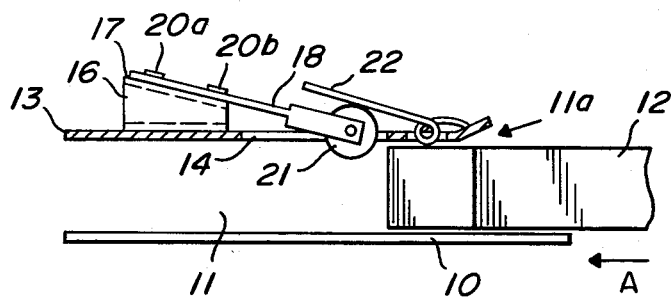
FIG. 3 is a cross sectional side view of the device in FIG. 2 taken along line 3—3 with the tape cartridge shown only in a partially inserted state.
Figure 4:
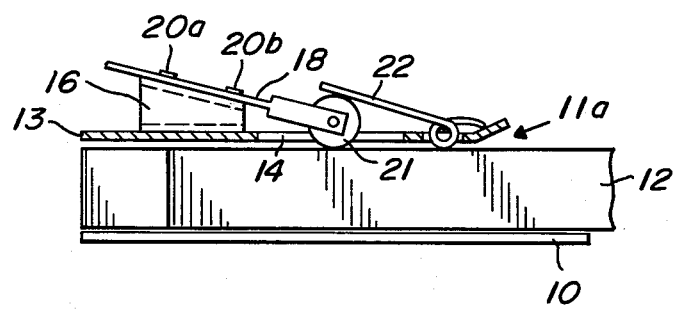
FIG. 4 is a cross sectional side view of the device in FIG. 2 with the tape cartridge shown in a fully inserted state.

The operation of the ejection preventing device of the present invention will now be described. As shown in FIG. 3, before the cartridge 12 is inserted into the cartridge entryway 11, the sliding member 18 is placed in a forward position by the spring 22 and the resilient roller 21 projects into the cartridge entryway 11 to its maximum extent. When the cartridge 12 is inserted in the direction A, the front face of the cartridge 12 engages and pushes the resilient roller 21 until a front edge 19a of the guide groove 19 engages the stopper pin 20b. Since the sliding member 18 slides on the forwardly inclined surface 17 of the attachment 16, the amount of the resilient roller 21 projecting into the cartridge entryway 11 becomes less as the cartridge 12 is inserted deeper into the cartridge entryway 11. When the cartridge 12 is pushed into the cartridge entryway 11 such that the front edge 19a of the guide groove 19 engages the stopper pin 20b, further insertion of the cartridge 12 results in pushing the resilient roller 21 upward against the force of the spring member 22 while the resilient roller 21 maintains engagement with the upper surface of the cartridge 12. After full insertion, the cartridge 12 is retained in a predetermined position by a retaining mechanism (not shown).

In order to discharge (eject) the cartridge 12 from the cartridge entryway 11, a solenoid plunger or the like is used to push the cartridge 12 in the forward direction toward the insertion end 11a. When the cartridge 12 is so pushed, the resilient roller 21, which is in pressure contact with the upper surface of the cartridge 12, is moved in the forward direction (toward end 11a) until a rear edge 19b of the guide groove 19 engages the stopper pin 20a. The magnitude of the pressure exerted on the cartridge 12 by the roller 21 proportionally increases as the resilient roller 21, or the cartridge 12, moves in the forward direction toward the insertion end 11a, and the magnitude of this pressure becomes maximum when the rear edge 19b of the guide groove 19 engages the stopper pin 20a. The result is that the ejection movement of the cartridge 12 toward end 11a is rapidly reduced and the cartridge 12 stops moving.

What has been described is an effective cartridge spring-out action preventing device which can be used in a magnetic tape recording and reproducing apparatus without damage to the cartridge and danger to the operator.

Furthermore, when a cartridge is inserted into the cartridge entryway 11, the resilient roller 21 is pushed into a rearward position where the magnitude of the pressure exerted on the cartridge by the roller 21 is minimum, which permits the cartridge to be smoothly loaded into the tape player with a minimum insertion force.

While I have shown and described specific embodiments of this invention, further modifications and improvements will occur to those skilled in the art. All such modifications which retain the basic underlying principles disclosed and claimed herein are within the scope of this invention.

I claim:

1. In an apparatus for recording and/or playing a magentic tape contained in a cartridge and including a cartridge entryway with an insertion end for receiving a cartridge and a retaining plate outside of said cartridge entryway, the combination comprising:
   said retaining plate outside of said entryway formed with a hole;
   an attachment attached to said retaining plate and having an upper inclined surface;
   a sliding member having a front end provided with a roller, means mounting said sliding member on said inclined upper surface of said attachment for sliding movement toward and away from said insertion end, said sliding member mounted so that said roller projects into said cartridge entryway through said hole in said retaining plate to be contacted and moved by a cartridge during insertion in said entryway and the amount of said roller projecting into said cartridge entryway decreases as the cartridge moves said sliding member away from said insertion end; and
   a spring means urging said roller downward through said hole and into said entryway;
   whereby said roller exerts one pressure on a cartridge as the cartridge is inserted and a larger pressure on the cartridge as the cartridge is ejected from said entryway.

2. A device according to claim 1, wherein said mounting means includes a rear portion of said sliding member with a guide groove in operative engagement with spaced stopper pins fixed with respect to said attachment which determine the distances that said sliding member can move on said inclined surface of said attachment.

3. A device according to claim 1, wherein said roller is formed from a resilient material.

4. A cartridge ejection device comprising:
   a cartridge entryway with an insertion end for receiving a cartridge;
   an attachment fixed in its position exterior to said entryway and having an upper inclined surface;
   a sliding member having a front end provided with a contact means for contacting cartridges during insertion in said entryway, means mounting said sliding member on said inclined upper surface of said attachment for sliding movement toward and away from said insertion end, said sliding member mounted so that said contact means projects into said cartridge entryway to be contacted and moved by a cartridge during insertion in said entryway and the amount of said contact means projecting into said cartridge entryway decreases as the cartridge moves said sliding member away from said insertion end; and
   a spring means urging said contact means into said entryway;
   whereby said contact means exerts one pressure on a cartridge as the cartridge is inserted and a larger pressure on the cartridge as the cartridge is ejected from said entryway.

5. A cartridge ejection device according to claim 4, wherein said mounting means includes a rear portion of said sliding member with a guide groove in operative engagement with spaced stopper pins fixed with respect to said attachment which determine the distances that said sliding member can move on said inclined surface of said attachment.

6. A cartridge ejection device according to claim 5, wherein said stopper pins are mounted to said attachment.

7. A cartridge ejection device according to claim 4, wherein said spring means in combination with said sliding member causes said contact means to exert a force on cartridges being inserted into said entryway and a larger force on cartridges being ejected from said entryway.

8. A cartridge ejection device according to claim 7 which includes spaced stopper pins fixed with respect to said attachment which selectively engage said sliding member and determine the distances that said sliding member can move on said inclined surface of said attachment.

9. A cartridge ejection device according to claim 4, wherein said spring means acts to cause said contact means to exert a larger force on a cartridge in said entryway when said sliding member is closest to said entryway and to cause said contact means to exert a smaller force on a cartridge in said entryway when said sliding member is farthest away from said entryway.

10. A cartridge ejection device according to claim 9, wherein said contact means is a roller having frictional properties.

* * * * *